US008417224B1

(12) United States Patent
Young (10) Patent No.: US 8,417,224 B1
(45) Date of Patent: Apr. 9, 2013

(54) SYSTEMS AND METHODS FOR PROVIDING LIVE VOICEMAIL TO A MOBILE HANDSET

(75) Inventor: David W. Young, Buford, GA (US)

(73) Assignee: Cellco Partnership, Basking Ridge, NJ (US)

(*) Notice: Subject to any disclaimer, the term of this patent is extended or adjusted under 35 U.S.C. 154(b) by 18 days.

(21) Appl. No.: 12/873,898

(22) Filed: Sep. 1, 2010

(51) Int. Cl.
*H04M 11/10* (2006.01)
(52) U.S. Cl. ............. 455/413; 455/456.3; 455/445; 455/412.1; 455/415; 455/412.2; 455/414.1; 455/432.1; 455/417; 370/356; 370/352; 370/230; 379/80; 379/80.18; 379/88.01; 379/88.03
(58) Field of Classification Search ........... 455/412.1, 455/445, 413, 456.3, 415, 412.2, 414.1, 432.1, 455/417; 379/88.13, 207.03, 80, 88.18, 88.01, 379/88.03; 370/356, 230, 493
See application file for complete search history.

(56) References Cited

U.S. PATENT DOCUMENTS

| | | | | |
|---|---|---|---|---|
| 7,330,538 | B2 * | 2/2008 | Dunsmuir | 379/88.18 |
| 8,000,712 | B2 * | 8/2011 | Gisby et al. | 455/445 |
| 8,060,065 | B1 * | 11/2011 | Lai et al. | 455/413 |
| 8,060,069 | B1 * | 11/2011 | Lai et al. | 455/415 |
| 2003/0187655 | A1 * | 10/2003 | Dunsmuir | 704/270 |
| 2005/0111363 | A1 * | 5/2005 | Snelgrove et al. | 370/230 |
| 2007/0140440 | A1 * | 6/2007 | Dunsmuir | 379/80 |
| 2007/0140441 | A1 * | 6/2007 | Dunsmuir | 379/80 |
| 2007/0143106 | A1 * | 6/2007 | Dunsmuir | 704/233 |
| 2009/0047933 | A1 * | 2/2009 | Spitzer | 455/412.1 |
| 2009/0086937 | A1 * | 4/2009 | Horn et al. | 379/88.13 |
| 2009/0131060 | A1 * | 5/2009 | Silver | 455/445 |
| 2009/0268635 | A1 | 10/2009 | Gallagher et al. | |
| 2010/0167700 | A1 * | 7/2010 | Brock et al. | 455/413 |
| 2010/0220585 | A1 * | 9/2010 | Poulson et al. | 370/216 |
| 2010/0260173 | A1 * | 10/2010 | Johnson | 370/356 |
| 2010/0322394 | A1 * | 12/2010 | Albert et al. | 379/88.13 |
| 2011/0105089 | A1 * | 5/2011 | Ellis et al. | 455/413 |

OTHER PUBLICATIONS

Jeong-Je Cho*, Jin-Ho Hwang*, Nak-Po Kim*, Feb. 7-10, 2010 Novel FMC network composition methods in 3W (WiBro, WiFi and WCDMA) environments.*

* cited by examiner

*Primary Examiner* — Joseph Arevalo (57) ABSTRACT

The exemplary live voicemail functionality offers a user of a mobile station the ability to listen to a voicemail message in real-time, as the message is being recorded in a voicemail platform. The mobile communication network serving the user directs an incoming call intended for the mobile station to the voicemail platform, which records the audio for the incoming message. The network infrastructure also duplicates the audio and directs the duplicate audio to the mobile station for real time monitoring of the incoming message by the user, as the platform is recording the voicemail message.

21 Claims, 11 Drawing Sheets

SYSTEMS AND METHODS FOR PROVIDING LIVE VOICEMAIL TO A MOBILE HANDSET

TECHNICAL FIELD

The present subject matter relates to systems and methods for providing a mobile station with the capacity for monitoring voicemail in real time, simultaneously with the recording of the voicemail.

BACKGROUND

In recent years, mobile stations have become "must have" devices for most people, in many countries. The communications that such devices offer, via wireless mobile communications network, enable users to talk and exchange various types of messages for business and personal reasons and to access information, all from or while traveling through any location where a network provides service.

There are situations, however, where it is undesirable or impractical for a user to receive and participate in an incoming call directed to the user's mobile station. For example, a user might not desire to receive a call during a work meeting or during a social occasion. In other situations, users may be busy performing a physical activity that could otherwise be hindered or disrupted in the person were to engage in an interactive phone conversation. Additionally, it is becoming more and more frequent for people to have a single mobile station as a main telephone. Often, there are situations where the user receives a call from a calling party with an unknown number, not recognized by the user. In other situations, due to a required option that networks provide users with the ability to hide their number when calling, mobile station users often receive calls from phones having blocked numbers.

Voicemail service, provided through a central office of the network has become commonplace for both landline and mobile station customers. If a call can not be completed to an intended destination, in the mobile scenario, to the intended destination mobile station, then the network redirects the call to a voicemail system. The voicemail system is a specialized computer that answers the call and stores a message from the caller in digital form. Many of the situations outlined above, where it is undesirable or impractical for a user to receive and participate in an incoming call directed to the user's mobile station, result in calls routed to a network platform providing the voicemail service to the mobile subscriber where the callers leave messages for later retrieval. Once stored, a voicemail message is available for retrieval and playback to the intended recipient. However, playback often entails a later call to the voicemail system. Many older customer premises-based answering machines offered a monitoring capability in the form of an audible output of the caller's voice message, in real-time, as the machine recorded the audio of the incoming message. However, with voicemail, the call is redirected to the voicemail platform. Hence, there is no link to the called subscriber's mobile station during message recording, therefore traditional network based voicemail has not offered a real-time message monitoring capability.

The need for a later call to retrieve a message imposes a delay on the called party's ability to hear the message and determine its importance. Hence, there is still room for an improved/simplified technique for accessing a voicemail message.

SUMMARY

The teachings herein provide improved methods and equipment (e.g., mobile station and/or programming for the station) to provide live voicemail to a user of a mobile station connected to a wireless network.

For example, in one aspect, the detailed description and drawings disclose a method of providing live voicemail to a mobile station user or subscriber over a wireless communications network.

For some applications, a method of providing live voicemail to a mobile station connected to a wireless mobile communications network includes receiving an incoming call to a mobile station, directing the call to voicemail, duplicating the call/voicemail, and directing the duplicate to the mobile station for monitoring by the user.

In some situations, receiving an incoming call comprises receiving a call over a packet switched network. Receiving an incoming call can include receiving a call over a voice over interne protocol (VOIP), voice over LTE (VOLTE), and/or voice over LTE via generic access (VOLGA) architectures, where LTE refers to long-term evolution in the context of 3G mobile networking technology. For some applications, a method of providing live voicemail to a user can include receiving an incoming call over a circuit switched traffic network and/or signaling for the call utilizing SS7 signal switching. Duplicating the call/voicemail can utilize a media gateway and voice over packet communications. Utilizing a media gateway can include directing one set of voice packets to a MSC for delivery to the user's mobile station and another set of voice packets to voicemail storage.

The detailed description and drawings also disclose wireless network infrastructures useful for providing live voicemail to the mobile station user or subscriber. An example can include a network infrastructure for live voicemail through a wireless network, the infrastructure that includes a wireless network configured to receive a call, e.g., from a first mobile station, a landline phone, or automated equipment, and direct the call to a called mobile station, a voicemail platform for storing a voicemail message from the call origination, i.e., the calling party/equipment, in response to the mobile station not accepting the call, and a media gateway configured to cause duplication of the voicemail message and routing of the duplicated message to the mobile station.

For example, the network infrastructure can be configured such that the routing of the duplicated message to the mobile station is one-way without the ability to induce any audio back to call origination, e.g., a first mobile station or landline phone. In another example, the network infrastructure is configured such that the infrastructure comprises a packet-switched infrastructure. The packet-switched infrastructure can include a VOLGA infrastructure, a VOLTE infrastructure, and/or a VOIP infrastructure. A VOLGA infrastructure can include a VOLGA access network controller (VANC) infrastructure, in some situations. In some instances, the packet-switched infrastructure can include a LTE infrastructure. In some instances, the LTE infrastructure includes an Evolved Packet Core (EPC).

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Functionality, systems, and methods for providing a mobile station with live voicemail are shown and described. The live voicemail feature allows a user of a mobile station to listen to a voicemail message in real-time as it is being recorded.

Figure 1:
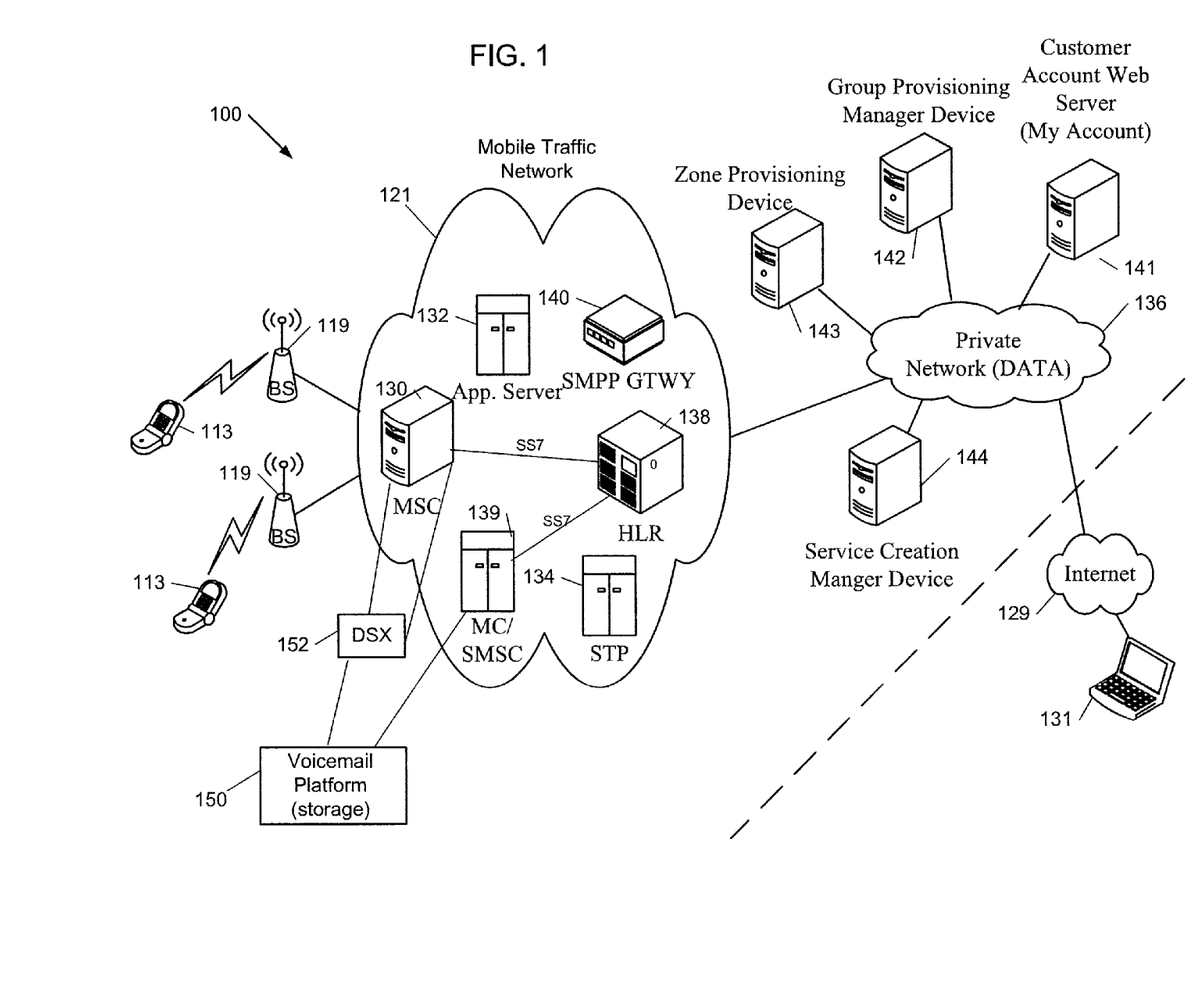
FIG. 1 is a functional block diagram that depicts various components of an exemplary mobile communications network infrastructure.

Reference now is made in detail to the examples illustrated in the accompanying drawings and discussed below. FIG. 1 illustrates a mobile communication network 100 as may be operated by a carrier or service provider to provide a wide range of mobile communication services and ancillary services or features to its subscriber customers and associated mobile station (MS) users. The elements collectively indicated by the reference numeral 100 generally are elements of the network and are operated by or on behalf of the carrier, although the mobile stations may be sold to and owned by the carrier's customers. The mobile communication network 100 provides communications between mobile stations as well as communications for the mobile stations with networks and stations (not shown) outside the mobile communication network 100.

The wireless mobile communication network 100 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 113 may be capable of conventional voice telephone communications and data communications.

For purposes of later discussion, several mobile stations 113 appear in the drawing, to represent examples of the mobile stations that may receive various services via the mobile communication network 100.

Mobile stations 113 can take the form of portable handsets, smart-phones or personal digital assistants, although they may be implemented in other form factors. Mobile stations 113 can include media content. The media content can be configured to execute on many different types of mobile stations 113. For example, a mobile station application can be written to execute on a binary runtime environment for mobile (BREW-based) mobile station. In further instances, a mobile station application can be written to execute on a Windows Mobile based mobile station, Android, I-Phone, Java Mobile, or RIM based mobile station such as a BlackBerry or the like.

The mobile communication network 100 can be implemented by a number of interconnected networks. Hence, the overall network 100 may include a number of radio access networks (RANs), as well as regional ground networks interconnecting a number of RANs and a wide area network (WAN) interconnecting the regional ground networks to core network elements. A regional portion of the network 100, such as that serving mobile stations 113, can include one or more RANs and a regional circuit and/or packet switched network and associated signaling network facilities.

Physical elements of a RAN operated by one of the mobile service providers or carriers, include a number of base stations represented in the example by the base stations (BSs) 119. Although not separately shown, such a base station 119 can include a base transceiver system (BTS), which can communicate via an antennae system at the site of base station and over the airlink with one or more of the mobile stations 113, when the mobile stations are within range. Each base station can include a BTS coupled to several antennae mounted on a radio tower within a coverage area often referred to as a "cell." The BTS is the part of the radio network that sends and receives RF signals to/from the mobile stations 113 that are served by the base station 119.

The radio access networks can also include a traffic network represented generally by the cloud at 121, which carries the user communications and data for the mobile stations 113 between the base stations 119 and other elements with or through which the mobile stations communicate. In some examples, the mobile traffic network 121 includes network elements that support mobile station media content transfer services such as mobile switching centers (MSCs) 130, signal transfer points (STPs) 134, and an application server (App. Server) 132. The network can also include other elements that support functionality other than media content transfer services such as messaging service messages and voice communications. Examples of other network elements that may be used in support of messaging service message communications include, but are not limited to, message centers (MCs) 139, home location registers (HLRs) 138, simple messaging service point-to-point (SMPP) gateway 140, and other network elements such as wireless internet gateways (WIGs), and visitor location registers (VLRs) (not shown). Other individual elements such as switches and/or routers forming the traffic network 121 are omitted here form simplicity. It will be understood that the various network elements can communicate with each other and other aspects of the mobile communications network 110 and other networks, e.g., the public switched telephone network (PSTN) and the Internet, either directly or indirectly.

The mobile switching center (MSC) 130 is responsible for managing communications between the mobile station and the other elements of the network 110. In addition, the MSC 130 is responsible for handling voice calls and messaging service message requests as well as other services (such as conference calls, FAX and circuit switched data, messaging service communications, Internet access, etc.). The MSC 130 sets up and releases the end-to-end connection or session, and handles mobility and hand-over requirements during the call. The MSC 130 also routes messaging service messages to/from the mobile stations 13, typically from/to an appropriate MC 139. The MSC 130 is sometimes referred to as a "switch". The MSC 130 manages the cell sites, the voice trunks, voicemail, and SS7 links.

The message center (MC) 139, in some examples, allows messaging service messages to be exchanged between mobile telephones and other networks. For SMS messaging, for example, the MC 139 receives packet communications containing text messages from originating mobile stations and forwards the messages via the signaling resources and the signaling channels to the appropriate destination mobile stations. The MC 139 may receive messages from external devices for similar delivery to mobile stations, and the MC 139 may receive similar messages from the mobile devices and forward them to servers or terminal devices, in either case, via an Internet Protocol (IP) packet data network.

In some examples, the MC 133 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 121 to carry message traffic between a Short Message Service Center (SMSC) 139 and the mobile stations. The SMSC 139 supports mobile station to mobile station delivery of text messages. However, the SMSC 139 also supports communication of messages between the mobile stations and devices coupled to other networks. For example, the SMSC 139 may receive incoming IP message packets from the Internet 129 for delivery via the network 121, one of the base stations 119 and a signaling channel over the air link to a destination mobile station. For this later type of SMS related communications, the network 110 also includes one or more Short Message Peer-to-Peer (SMPP) protocol gateways 140.

In other examples, the MC 139 can include functionality related to the Enhanced Messaging Service (EMS) or Multimedia Messaging service (MMS). An EMS message can have special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 139 can be considered in whole or in part a multimedia messaging service center (MMSC).

Although a single MC 139 is shown, a network 10 can have many geographically dispersed MCs 139. The MCs 139 can include destination routing tables (DRTs). In essence the DRTs are databases within the MCs 139. A DRT contains a list of the MDNs which are associated with the various MCs 139. For example, a first MDN is associated with a MC 139 in California while a second MDN is associated with a MC 139 in Virginia. The DRTs are used to determine which MC 139 should attempt to deliver an incoming messaging service message to the destination MDN. For example, if a user associated with the MC in California sends an SMS to a user associated with the MC 39 in Virginia, the California MC 139 sends the SMS to the Virginia MC 133 for delivery to the destination MDN. The communication among the MCs 139 occurs using know protocols such SMPP and the like.

The HLR 138, in some examples, stores a subscriber profile for each of the wireless subscribers and their associated mobile stations 113, 115, and 117. The HLR 138 may reside in an MSC 130 or in a centralized service control point that communicates with the MSC(s) 134 via an out-of-band signaling system such as an SS7 network. The HLR 138 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 138 can also be a stand-alone device. The HLR also tracks the current point of attachment of the mobile station to the network, e.g., the identification of the MSC 130 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 130. Each base station 119 in the network is served by a single VLR, hence a subscriber cannot be present in more than one VLR at a time. The data stored in the VLR has either been received from the HLR 138, or collected from the mobile station.

The SMPP gateway 140 provides functionality to transport messaging service messages to other mobile communication networks and also receive messaging service messages from other networks. The SMPP gateway 134 supports communications using the SMPP protocol. SMPP gateways 140 are Short Message Peer-to-Peer (SMPP) gateways 140 used to connect the wireless communication network (such as an Internal Protocol IP network on the left of the SMPP Gateway 140 in FIG. 1) to another network (such as a public Internet network on the right of the SMPP Gateway 140 in FIG. 1). The SMPP Gateway 140 allows the MC 139 to receive and send messages in IP packet format. The SMPP Gateway 140 is an entity within the wireless network 100 that acts as an intermediary between the wireless service provider network and other networks. For example, the SMPP Gateway 140 converts messages in protocol(s) used by other applications and devices, e.g. Extensible Markup Language (XML), Hypertext Mail Protocol (HTMP), etc., to and from the SMPP protocol. The SMPP messages ride on IP transport, e.g., between the SMPP Gateway 140 and the MC 139.

In addition, the traffic network portion 121 of the mobile communications network 110 connects to a private data network 136. The private data network 36 connects to the traffic network portion 121 via a gateway (not shown). The gateway can provide protocol conversions between the protocols used by the traffic network 121 and the protocols used by the private data network 136. The private data network 136 can be in communication with various auxiliary services servers, e.g., such as those providing additional services to the users of the network 100, and/or to operations support personnel of the service provider or carrier that operates the network 100. For example, the carrier can also offer its subscribers on-line access to a variety of functions related to the subscribers' accounts, such as review of billing statements and usage data, on-line payment, subscription changes, password control or the like. For that purpose, the carrier can operate a customer account web server 141, offering a "MyAccount" type subscriber interface via the Internet, e.g., a "My Verizon" page for a user having a Verizon Wireless account. Hence, a user's terminal, such as PC 31, may be used to access on-line information about a subscriber's account, which the mobile carrier makes available via the carrier's MyAccount web site accessible through the Internet 29.

In addition, a group provisioning manager device (GPMD) 142, a zone provisioning device (ZPD) 143, and a service creation manager device (SCMD) 144 can be provided in communication with the private data network 136 media content transfer functions, e.g., downloading of media content. The GPMD 142 can also be referred to as a group provisioning manager network device. For discussion purposes, each of the GPMD 142, ZPD 143, and SCMD 144 can be a stand alone computing device such as a server. The functionality described below with respect to each of the GPMD 142, ZPD 143, and SCMD 144 can, however, be provided by one or multiple different computing devices. In other words, the GPMD 142, ZPD 143, and SCMD 144 need not be a stand-alone computing device in various configurations. The SCMD 144 can maintains provisioning information for a particular end user and mobile station 13. As explained in further detail below for FIG. 2, a network can be provided with various elements for determining the location of a mobile and allowing software applications to make use of such position information. A voicemail platform 150, e.g., hard drive storage, is shown in addition to a digital signal cross connect (DSX) 152.

Figure 2:
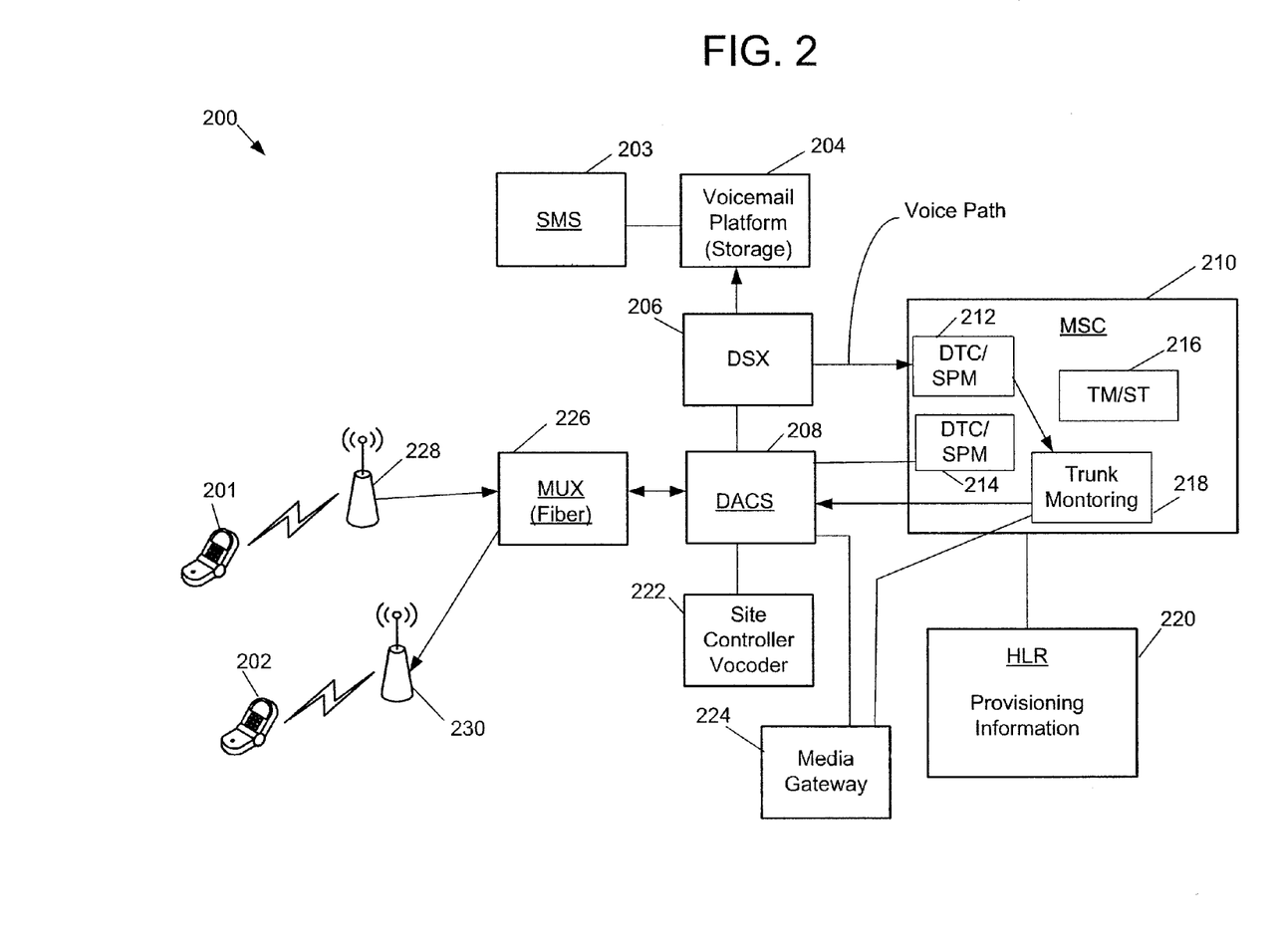
FIG. 2 is a functional block diagram that depicts various components of an exemplary mobile communications network infrastructure as used for providing live voicemail to a user.

An example of a wireless network with infrastructure for support of live voicemail is shown FIG. 2. Network 200 includes elements similar to those of network 100 of FIG. 1, including one or more mobile stations 201-202. FIG. 2 depicts a scenario where a circuit-switched incoming call is provided to a circuit-switched mobile station. The mobile devices or stations 201-202 can be advanced devices, e.g., a Blackberry/RIM, Android, Palm, LiMo, Java, or Linux device. With continued reference to FIG. 2, the incoming call is routed out of the BSC vocoder 222. As shown, a T1 connection links the DTC/SPM through the DSX 206 and/or DACS 208, and over to the Voicemail platform 204. The T1 can be optioned with in-band SS7 signaling on two channels of the T1 for call set up and the remaining 22 ds0 channels can be used for voice. The SS7 signaling can be set up in the Voicemail 204 and assigned a pointcode and also given the pointcode of the MSC 210. The MSC translation can be set up with the pointcode to the Voicemail that the subscriber is assigned. When a call set up is established on the SNMP and the SS7 to the MSC 210 and the called party does not answer the call is routed to the voicemails trunks and sent to the voicemail storage where the voice can be saved, e.g., on hard drive disk space. MSC 210 is present and can include two DTC/SPMs 212 and 214, trunk-monitoring and switching controller (TM/ST) 216, and trunk monitoring block 218, as shown.

As shown in FIG. 2, an incoming voice messages (from 202) is duplicated and split, with one trunk leading to the voicemail platform (storage) 204 and, simultaneously, one outbound voice signal being sent to the called party, e.g., at 202. A second path from the DACS 208 to the media gateway 224 allows for trunks to be established between the MSC 210 and the media gateway 224, through to the voicemail 204 and the called party, e.g., at 202. In this scenario, the call set up takes place, but the HLR 220 is queried to see if the subscriber has "live voice mail" feature enabled. If the feature is enabled and the called party does not answer the call is routed to the trunks going to the media gateway 224. The media gateway 224 recognizes the call needs to be routed to the voicemail point code and duplicates the voice packets and sends one to the MSC 210 and establishes the $2^{nd}$ path to the voicemail box. Now there are two audio transmissions: one being handled by the voicemail as a call-no answer, and the second being routed out of the MSC to the site controller 222 and to the called party. The called party will manually end the incoming call, but instead of no audio will receive the outbound audio that is also routed to the voicemail 204. This is, preferably, outbound only and the called party can not induce any audio back to the originating caller. The called party can then end the call for a second time to stop the audio transmission. The software on the mobile station (and the network architecture) can be configured to allow the called party to choose between three (3) options, e.g., by selection one of three buttons, or virtual switches on a touch screen: call answer, end call, (send directly and only to voicemail), or "monitor call" (send to voicemail and monitor audio). The call is set up in two directions and the called party will not be able to end the call going to voicemail, only end the transmission that is being received by the called party's phone. When the originating caller disconnects the call, the path is torn down. The SMS 203 sends a message to the called party that a voice message has been left.

Figure 3:
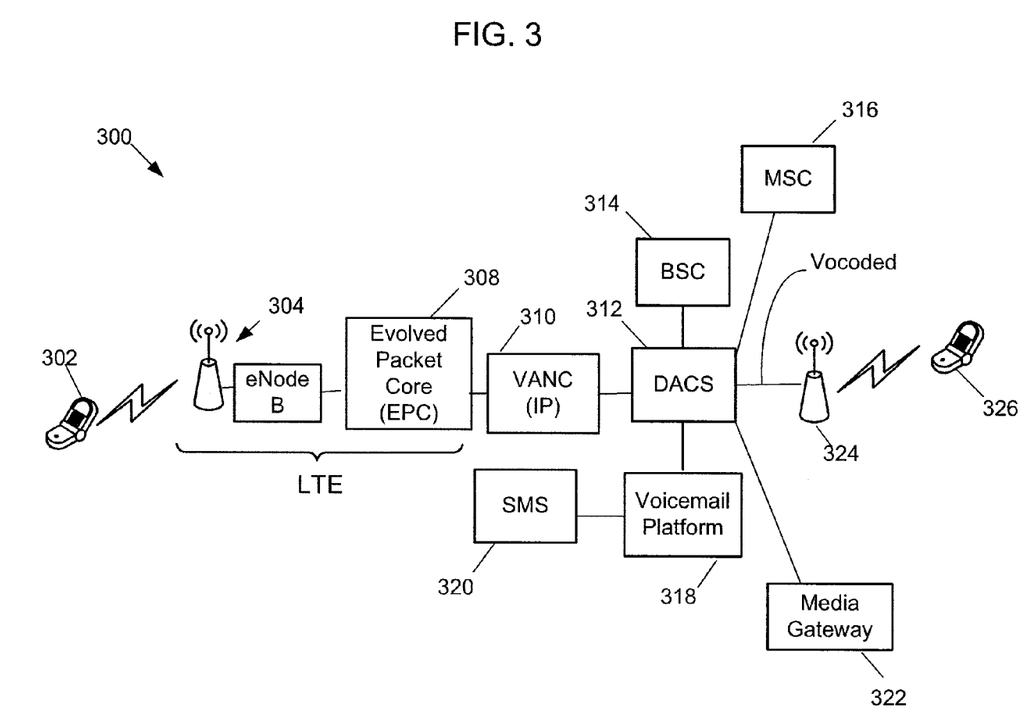
FIG. 3 is a functional block diagram that depicts various components of an exemplary mobile communications network infrastructure as used for providing live voicemail to a user, including a circuit-switched to packet-switched infrastructure.

FIG. 3 shown a network infrastructure 300 and corresponding method for providing live voicemail while accommodating a circuit-switched to packet-switched (e.g., VOLGA) call. As shown in FIG. 3, a VANC block 310 is added to establish a route between a LTE network and a MSC wireless network infrastructure. LTE includes an eNodeB (E-UTRAN B, or base station) 304 and an Evolved Packet The MSC infrastructure can include MSC 316, BSC 314, and SMS 320. The EPC 308 can include a number of elements, e.g., a MME, a SGW, and a PGW, as shown as described in further detail for FIG. 4. Voicemail platform 318 and media Core (EPC) 308. The VANC 310 behaves like a BSC (VoLGA A-mode) or RNC (VoLGA Iu-mode) towards the CS domain. The VANC also behaves like an Application Function (AF) towards the PCRF. The VANC includes a Security Gateway (SeGW) function that terminates a secure remote access tunnel from each UE, providing mutual authentication, encryption and integrity protection for signaling traffic. gateway 322 are also shown.

With continued reference to FIG. 3, when receiving an incoming voice message, the message is duplicated and split, with one trunk leading to the voicemail platform and, simultaneously, one outbound voice signal being sent to the called party. There is another path from the DACS to the media gateway to allow for trunks to be established between the MSC and the media gateway. In this scenario, the call set up takes place, but the Packet Core is queried to see if the subscriber has "live voice mail" feature enabled. If the feature is enabled and the called party does not answer a signal is sent to the MSC to establish the call to the gateway controller. The call is routed to the trunks going to the media gateway. The media gateway recognizes the call needs to be routed to the voicemail point code and duplicates the voice packets and sends path to the voicemail box and recognizes the other path needing to be routed to the VANC Volga gateway. The media gateway sets up a call (with outbound audio only) to the eNodeB and to the called party in one direction. The called party receives a duplicate audio that is being routed to the voicemail system. The call party can disconnect the call by ending the call a second time. When the originating caller disconnects the call, the path is torn down. The SMS sends a message to the called party that a voice message has been left.

Figure 4:
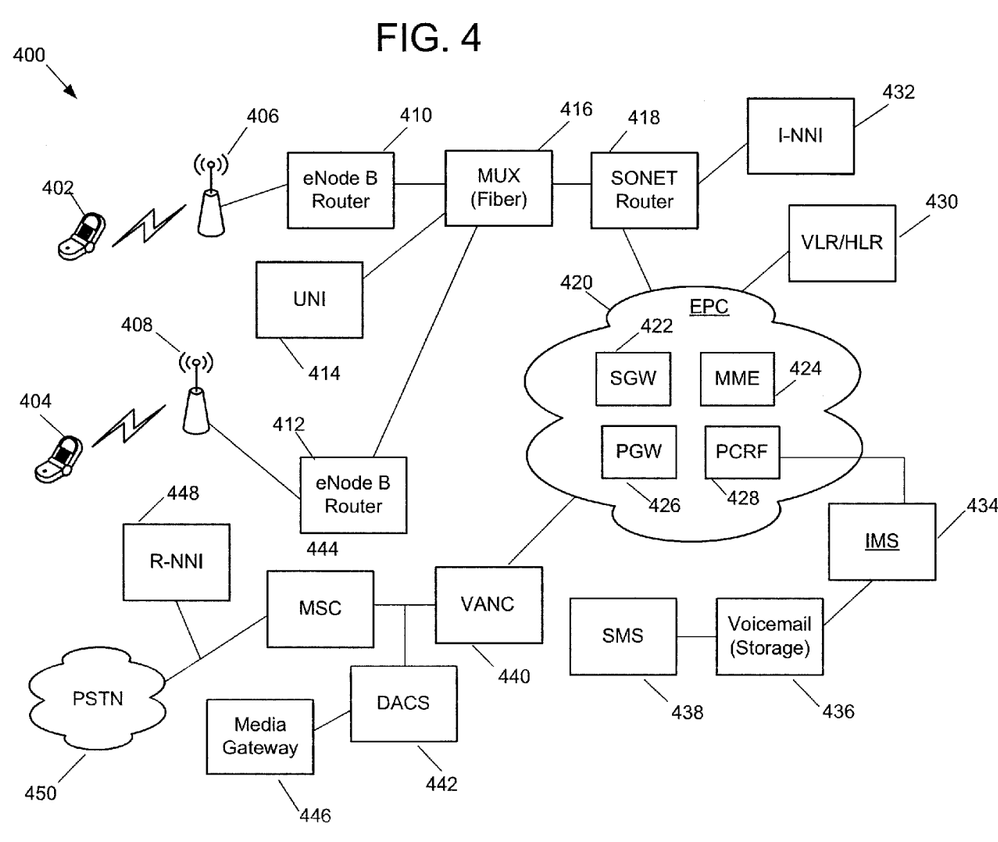
FIG. 4 is a functional block diagram that depicts various components of an exemplary mobile communications network as used for providing live voicemail to a user, including a packet-switched to packet-switched infrastructure.

FIG. 4 is a detailed diagram of a wireless communications network 400 with packet-switched infrastructure and elements that can be used to provide live voicemail for packet-switched to packet-switch calls. Mobile stations 402 and 404 are shown connected to the network 400 by way of eNodeB's 406 and 408 and routers 410 and 412, respectively. Network 400 includes a LTE/VOLTE network with the IMS 434 installed to allow the voice messages to be routed to a voicemail storage server 436 directly attached to the LTE network. VOLTE delivers SIP-based voice and messaging services over LTE radio Access Networks (RAN). A User Network interface (UNI) 414 is provided and this interface is located between the user's equipment and the operator's network. A Roaming Network Interface (R-NNI) 448, which is an interface located between the Home and Visited Network, can be provided as shown for use by a user that is not attached to their Home network, i.e., roaming. An Interconnect Network Interface (I-NNI), which is an interface located between the networks of the two parties making a call, can be provided as shown.

The Voicemail 436 is accessed through the PDN/SAE gateway (EPC 420) and through the IMS 434. EPC 420 includes SGW 422, MME 424, PGW 426, and PCRF 428. VANC 440 is connected to EPC 420 and MSC 444, DACS 442 and Media Gateway 446.

In providing live voicemail, e.g., to mobile station 404, the packet core gateway 426 will duplicate the voice and set up one call to the voicemail storage device and the other will be sent to the called party (outbound only.) In this scenario, the called party can have an option to connect to the originating party while the voicemail is being left. The call will go full two way audio and the voice call routed to the voicemail platform will be torn down. The call can now continue as a standard call and can be torn down by the called party.

Figure 5:
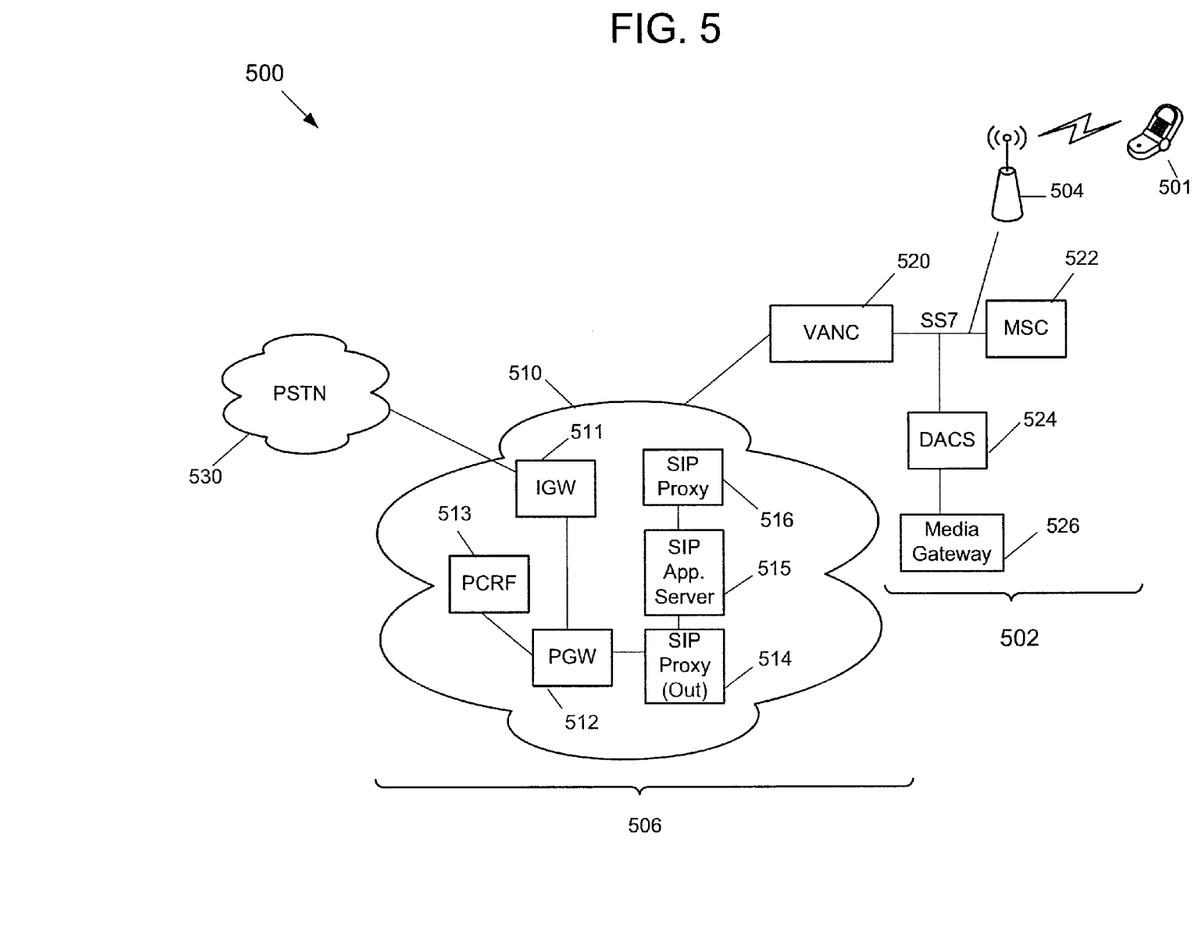
FIG. 5 depicts a call setup for providing live voicemail to a mobile station using session initiation protocol (SIP) signaling between a circuit-switched infrastructure and a packet-switched infrastructure.

FIG. 5 depicts a call setup 500 for providing live voicemail to a mobile station 501 using SIP between a circuit-switched infrastructure 502 and a packet-switched infrastructure 506. The circuit switched side connects a VANC 520 to a MSC 522. The VANC 520 works like a BSC to the MSC 522 and has trunks and SS7 signaling route sets and link sets between them. Mobile station is linked to base station 504, as shown, which is linked to the circuit switched infrastructure 502. DACS 524 and Media Gateway 526 are also connected to the circuit-switched infrastructure 502. Packet-switched infrastructure 506 includes an IGW 511, a PGW 512, and a PCRF 513, and cane be connected to the PSTN 530, as shown. Packet-switched infrastructure 506 also can include an outgoing SIP proxy 514, a SIP Application Server 515, and a SIP proxy block 516 as shown.

Continuing with the description of FIG. 5, in operation, the mobile subscriber registers with the MME over the LTE network. The MME checks the privileges and authenticates the subscriber through the HLR/HSS home subscriber server. The mobile is connected with the VANC 520 through a bearer channel using IP protocols. The mobile can acquire the VANC 620 IP by DHCP or it can be static assigned. The mobile then registers on the MSC 522 through the secure channel established. A dedicated channel is established between the VANC 520 and the MSC 522 through a secure channel. If a call needs to be set up to the VANC 520 from the circuit switched network a paging message is sent as though the VANC 520 was a BSC. Once the call is set up the MSC 522 recognizes the called party and sends the set up signal over the SNMP (simple network management protocol) and the phone begins to receive an audible alert (ringing). The called party then acknowledges the call will be sent to voicemail and to monitor call by ending the call. The second call end will end the audio being received from the called party. The MSC 522 will set up a call to the media gateway. The media gateway will recognize the call is being sent to the voicemail IP address (or point code circuit switched) and duplicate the call to both the called parties IP and the Voicemail IP address.

Figure 6:
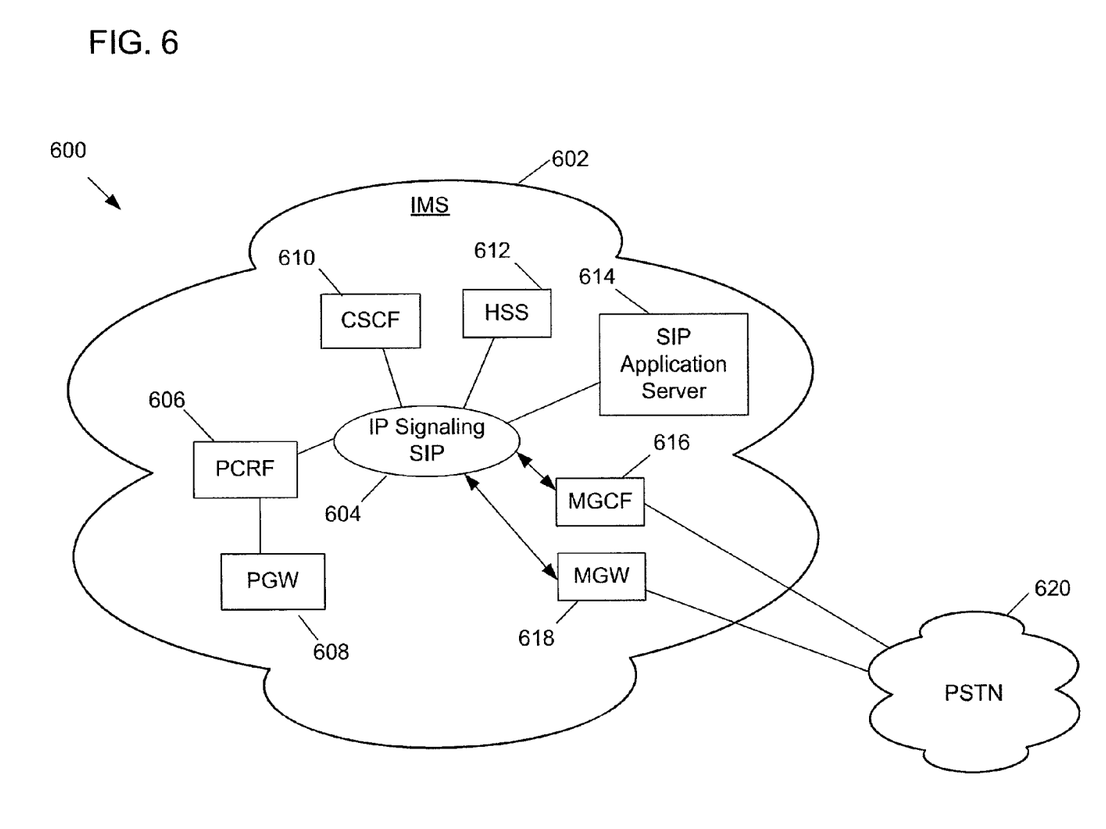
FIG. 6 is a diagram of an example of an Internet protocol (IP) multimedia subsystem (IMS) type network infrastructure useful in providing live voicemail to a mobile station, including an IMS and a public switched telephone network (PSTN).

FIG. 6 is a diagram of an example of an IMS network infrastructure 600 useful in providing live voicemail to a mobile station, including an IMS 602 and a PSTN 620. As shown, IMS 602 can include an IP signaling block that can provide session initiation protocol (SIP) 604. SIP 604 can be connected to packet core rules function (PCRF) block 604, which can be connected to packet gateway (PGW) 608, which is a node that terminates the interface towards packet data network (PDN), as shown. The SIP 604 can be connected to a call session control function block (CSCF) 610 as shown, as well as a home subscriber server (HSS) 612 and a SIP application server 614. Media gateway control function (MGCF) 616 is shown with media gateway (MGW) 618 connected between the SIP 604 and PSTN 620.

Figure 7A:
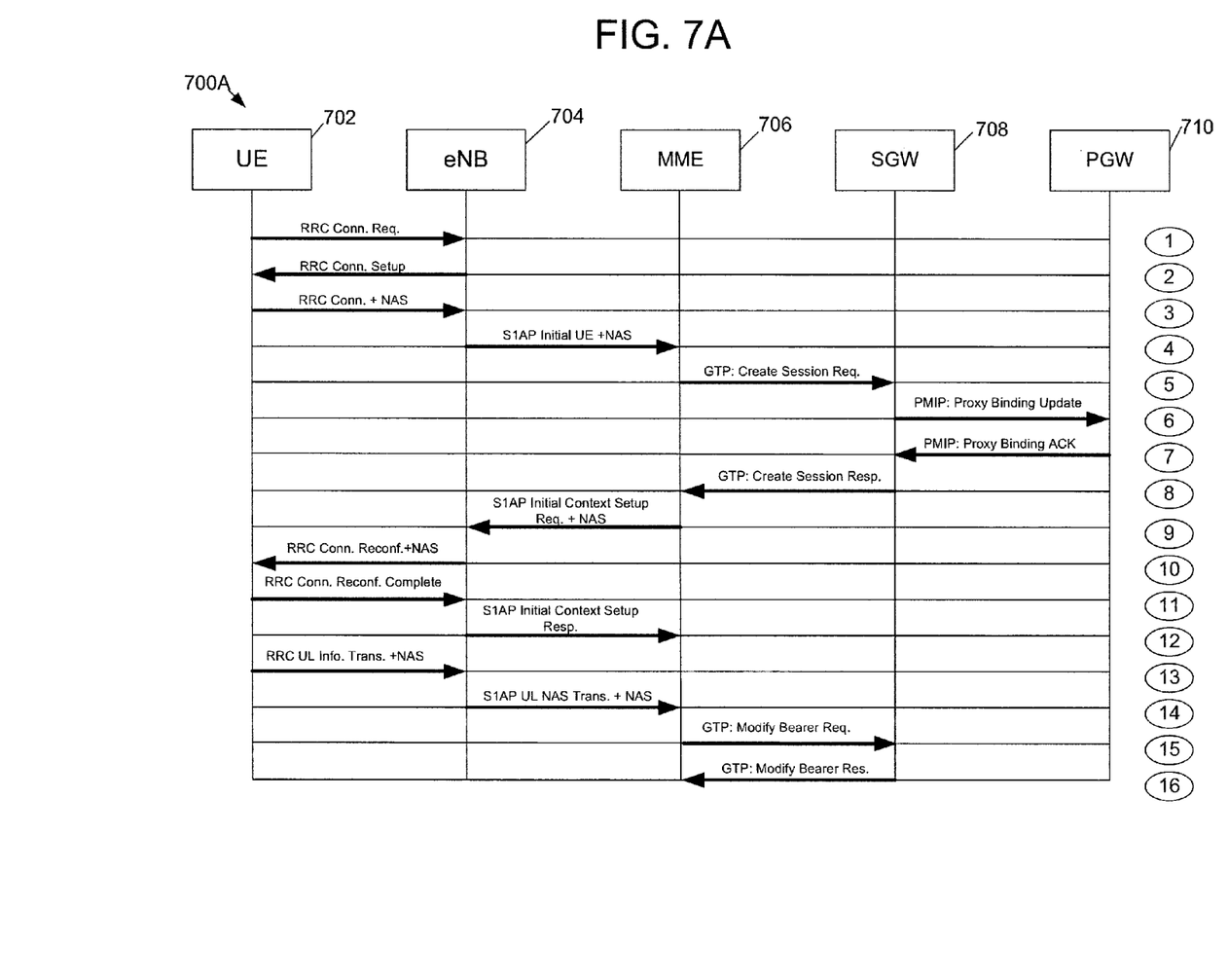
FIGS. 7A-7C depict call flow diagrams showing a standard user equipment (UE) registration on an LTE network with the Evolved packet core elements.

FIG. 7A depicts a call flow diagram 700A showing a standard UE registration on an LTE network with the Evolved packet core elements including MME, SGW, PGW and eNodeB. As shown at step 1, a UE 702 sends a RRC connection request to eNodeB 704. As shown at step 2, eNodeB 704 responds to the request and sends back a set up message to the UE 702. As shown at step 3, the UE 702 sends the RRC connection and the NAS to the eNodeB 704. Shown at step 4, the eNodeB 704 then contacts the MME 706 for s1AP initial UE plus NAS. As shown at step 5, the MME 706 sends a GTP create session request to the SGW 708.

Continuing with the description of FIG. 7A, the SGW 708 sends the Proxy Binding Update to the PGW 710, as shown at step 6. Next, the PGW 710 responds back with Acknowledge message to the SGW 708, as shown at step 7. Then, as shown at step 8, the SGW 708 replies to the GTP message with a create session response. At step 9, the MME 706 then responds to the S1AP initial context setup message. As shown at step 10, the eNodeB 704 notifies the UE RRC connection reconfigure+NAS. As shown at step 11, the UE 702 responds with a RRC Connection reconfigure complete message to the eNodeB 704. The eNodeB 704 notifies the MME 706 with the context setup response, as shown at step 12. Then, RRC UL information Trans.+NAS, as shown at step 13. At step 14, the eNodeB sends the S1AP UL NAS trans+NAS message to the MME. At step 15, the MME sends a GTP modify bearer request to the SGW. Finally, at step 16, the GTP: Modify Bearer Request is sent to the MME.

Figure 7B:
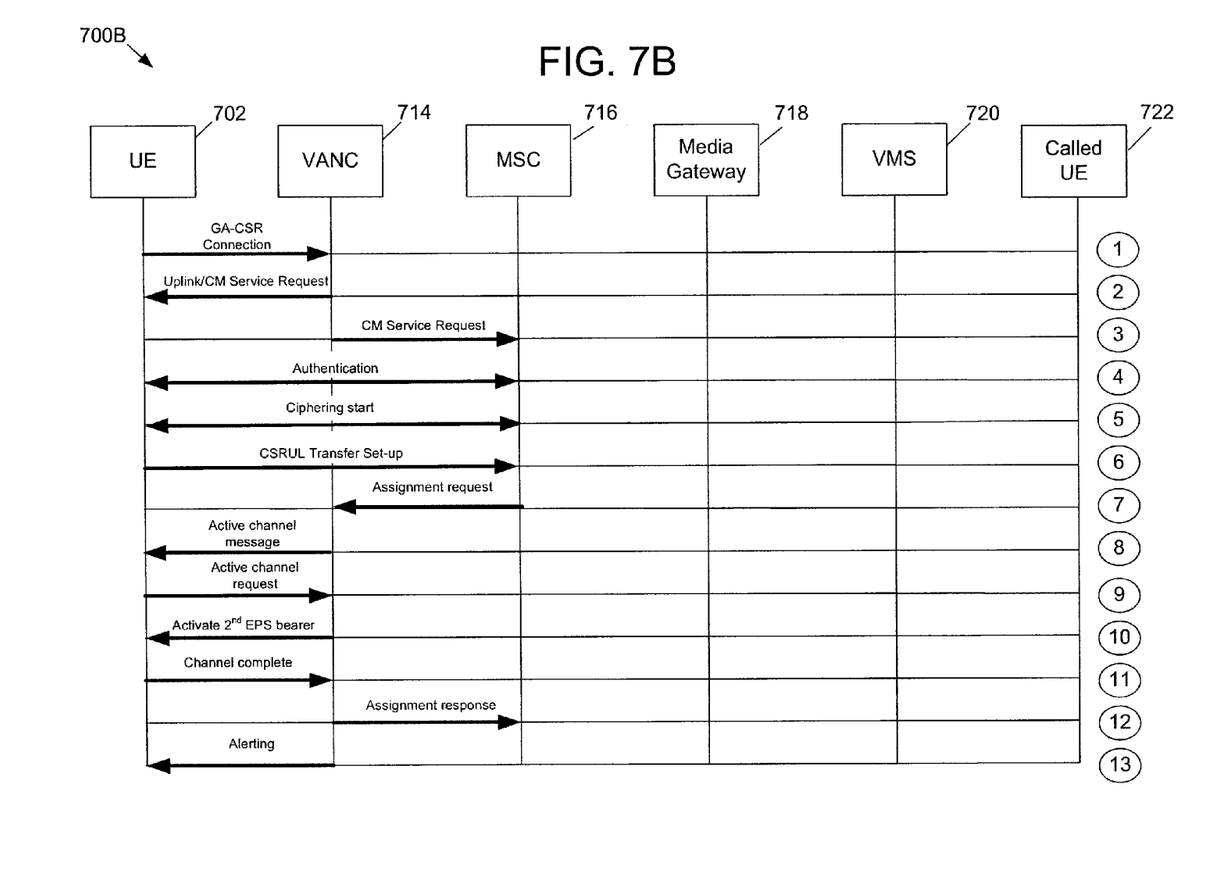

FIG. 7B is a call flow 700B of voice call over LTE/VOLGA. The signaling is depicted as taking place between a UE 702 and a VANC 714 on IP secure tunnels. As shown at step 1, the mobile UE 702 sends a message to the VANC 714 to change the connection state from idle to seized. At step 2, the uplink CM service request is sent from UE 702 to the VANC 714. As shown at step 3, the uplink CM service request is forwarded from the VANC 714 to the MSC 716. The MSC 716 starts the authentication process, verifies the UE 702 and sends back an authentication message, as shown at step 4. At step 5, the MSC 716 sends a message to the UE 702 that ciphering is started. This is a dedicated signaling path. As indicated at step 6, a CSR UL Transfer message is sent from the UE 702 to the MSC 716 to start the setup message. UE 702 transmit called parties phone number. As shown for step 7 the MSC 716 sends an assignment request to the VANC 714 to acknowledge the call is proceeding. At step 8, the VANC 714 sends "activate channel message" to UE 702 to prepare the mobile to start receiving voice packets. At step 9, the active channel request is sent from UE 702 to the VANC 714. At step 10, the UE 702 and VANC 714 activate a $2^{nd}$ EPS bearer to transmit data. As shown at step 11, an activate channel complete message is sent from the VANC 714 to the UE 702. As shown at step 12, an assignment response message sent from the VANC 714 to the MSC 716.

Figure 7C:
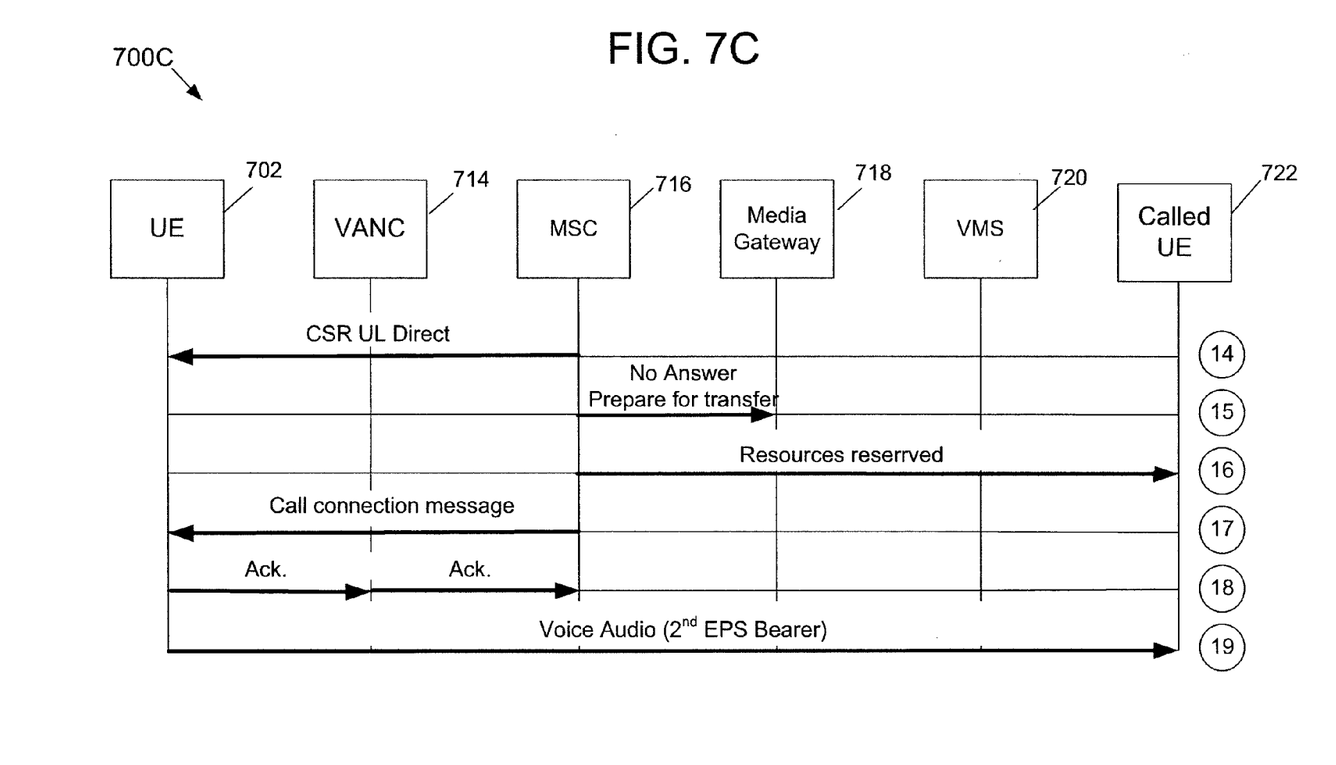

FIG. 7C depicts a continuation 700C of the method 700B shown in FIG. 7B. At step 14, a CSR UL Direct link is established between the MSC 716 and UE 702. At step 15, for the case of no answer, e.g., when a called party did not answer or sent a call to voicemail, the MSC 716 send a message to a media gateway (MGW) 718 to prepare for transfer of audio to voicemail and set up outgoing audio to called UE 702. As shown at step 16, the MSC 716 has reserved the resources to the media gateway 718. The media gateway 718 can then duplicate audio and send one set of voice packets call to the Voicemail system (VMS) 720 and the second call to the called party 722, along a transmit path only. In this way, the calling party 702 cannot know the called party 722 is monitoring the live voicemail. As shown at step 17, the MSC 716 sends message to VANC 714 and UE 702 that call is going to connect. As shown at step 18, the UE 702 sends acknowledgement to VANC 714, VANC 714 sends acknowledgement to MSC 716. As shown at step 19, a Voice Audio Starts message is provided on second EPS bearer. The call being set up in reverse from the MSC side to the LTE side is similar. The MSC 716 pages the VANC as though it was a BSC. The VANC 714 forwards the message on to the LTE in the form of packets. The mobile UE can be located from pages from the Base station and assigned an IP address to receive messages.

Figure 8A:
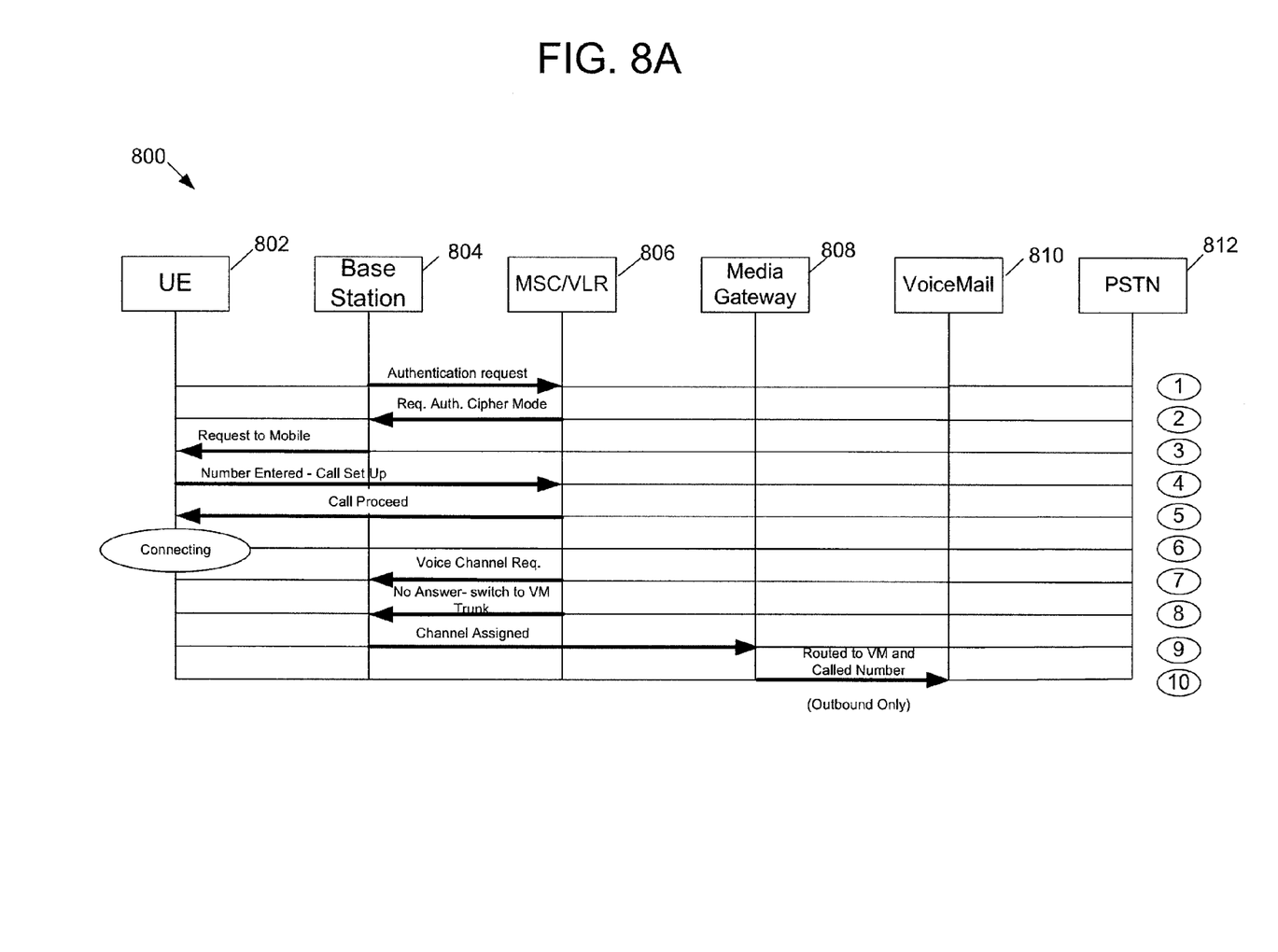
FIGS. 8A-8B depict an incoming call flow to a UE 802 from the PSTN.

FIG. 8A depicts an incoming call flow 800 to a UE 802 from the PSTN 812 (where the call can originate from other UE). As shown at step 1, a Page has been sent to mobile subscriber UE. An authentication request is consequently sent from the base station 804 to the MSC 806 that the Mobile subscriber 802 is going to receive a call on SNMP and a voice trunk will need to be reserved for the incoming call. As shown at step 2, the MSC 806 authenticates the user in the HLR and sends a Request for authorization to join cipher mode. As shown at step 3, the request is sent from the BSC 804 to the Mobile subscriber/user equipment 802 to begin sending the called digits. As shown at step 4, the called digits are sent to the MSC 806, and the SS7 route determines who owns the number and where the call needs to be routed to. As shown at step 5, a message sent from the MSC 806 to the UE 802 to switch to set up call. As shown at step 6, the UE 802 receives a ring back tone that sounds like ringing. As shown at step 7, the MSC 806 request the BSC 804 to reserve a voice channel because the call setup has been established and will be transferring to the voice trunk. The BSC 804 reserve a channel in case the audio is set up. As shown at step 8, the call either times out or is sent to voicemail 810 by the UE 802 receiving the call. In this scenario the base station 804 notifies the MSC 806 that call is being sent to voicemail 810 by the user. As shown at step 9, the MSC 806 has verified in the HLR 806 that the UE 802 has "live voice mail" enabled. The MSC 806 then routes the call to the trunks going to the media gateway (MGW) 808. As shown at step 10, the call is routed from the media gateway 808 to the pointcode of the voicemail 810 the subscriber is located on and the call is established to the called UE 802. Preferably, only an outbound only signal is sent to the called party 802. As shown at step 11, an Activate Channel complete message sent from the VANC (not shown) to the UE 802. As shown at step 12, an Assignment Response message is sent from the VANC to the MSC 808. As shown at step 13, the DL direct transfer alerting message is completed from the VANC to the UE 802. Consequently, the circuit switched channels are reserved for audio.

Figure 8B:
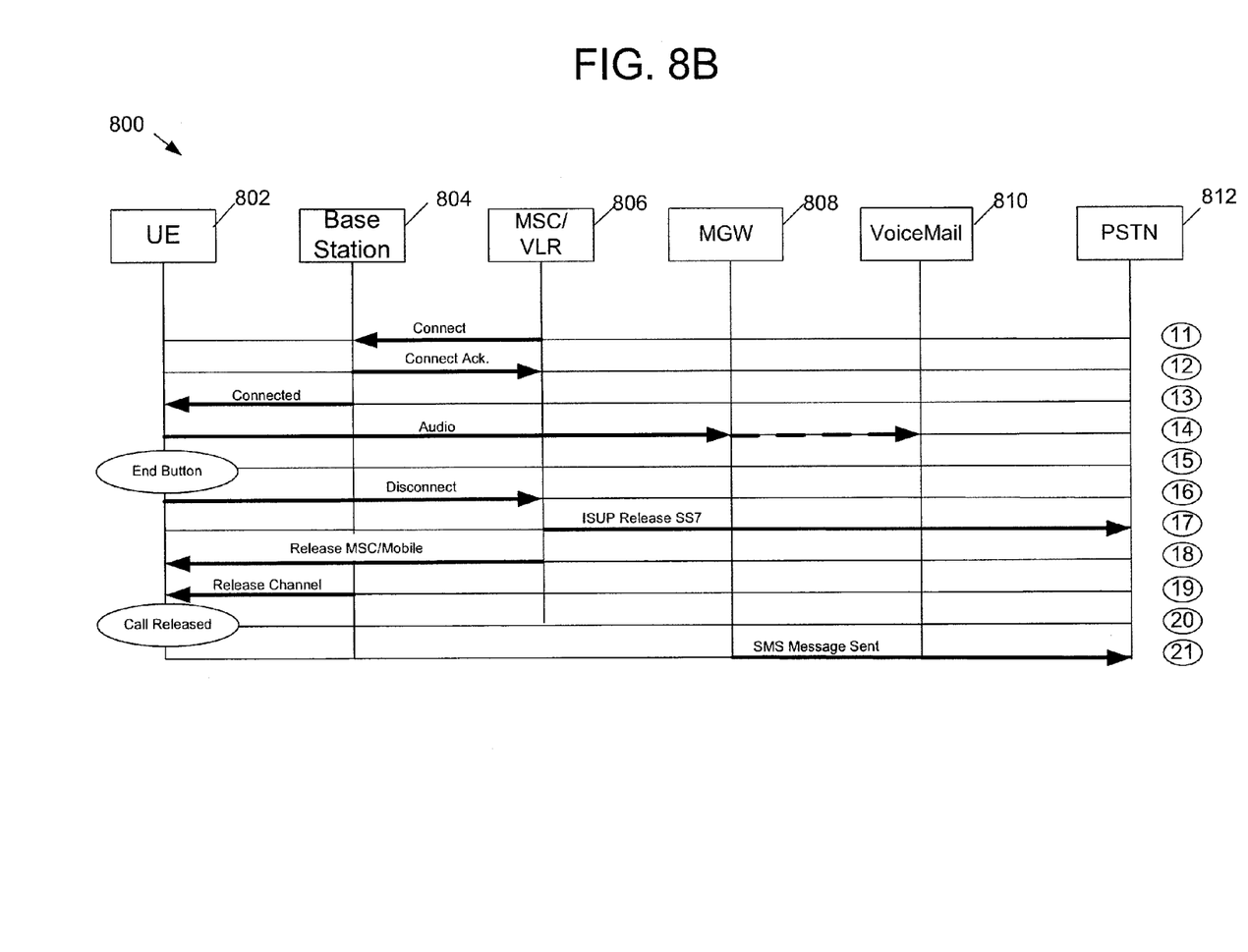

FIG. 8B depicts a continuation of method 800, shown in FIG. 8A. As shown at step 11 of FIG. 8B, the MSC 806 send a message to the BSC 804 to connect the call and switch to audio channel. As shown at step 12, the BSC 804 acknowledges the MSC 806 request and has a channel set up, notifies MSC 806 of the preferred channel for audio. As shown at step 13, the BSC 804 notifies the UE 802 the call is being connected and to pass the audio. As shown at step 14, the audio is set up to the called UE 802, but only in one direction. The UE 802 can monitor the originating called parties voice being sent to the voicemail platform 810. The call handed off to the gateway controller and is duplicated and two paths are set up. The voicemail 810 only recognizes the call setup as a normal MSC 806 call set up and save the voice message on the hard drive array 810. As shown at step 15, the UE 802 that received the call and is monitoring the call can choose to end the call and terminate the voice coming to his or her mobile station. The end user can press the end button and tear down both paths of the call ending the audio to the receiving UE 802 and the voicemail box 810. As shown at step 16, a disconnect message is sent from the UE to stop sending audio and tear down the portion of the call being routed to the receiving mobile. As shown at step 17, an ISUP message is sent from the MSC to the network of the originating party to release the resources used for the call and tear it down (from the PSTN 812). As shown at step 18, the MSC 806 sends a message to the BSC 804 and the called UE 802 to release all resources and end the call. As shown at step 19, the BSC 804 releases the channel allocated to the called UE 802 and the all audio is ended. As shown at step 20, the call is released and the called UE 802 is free to make another voice call. As shown at step 21, when the originating caller finishes the voicemail and SMS message is sent notifying the called party a message is waiting.

As shown by the above discussion, functions relating to live voicemail may be implemented on network elements such as media gateways and/or voicemail platforms, configured for wireless communication via a mobile communication network, operating as an one of the mobile stations as shown by way of example in FIGS. 1-2. The software functionalities involve programming, including executable code as well as associated stored data, e.g., files used for the code recognition. The programming code is executable by the processor (microprocessor or the like) that functions as the control element of the particular mobile station device. In operation, the code is stored within the memory of the mobile station for loading and execution by the processor. At other times, however, the executable code may be stored at other locations and/or transported for loading into the mobile station. Execution of such code by the corresponding network elements enables the wireless network to implement the methodology of providing live voicemail to mobile stations, in essentially the manner performed in the examples discussed and illustrated herein.

Hence, aspects of the methods of providing live voicemail outlined above may be embodied in programming. Program aspects of the technology may be thought of as "products" or "articles of manufacture" typically in the form of executable code and/or associated data that is carried on or embodied in a type of machine readable medium. "Storage" type media include any or all of the non-transitory, tangible memory of the computers, processors, mobile stations or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from a computer or processor into the gateway and/or the voicemail platform to add or update the live voicemail functionality of the network infrastructure. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, "storage" media relates to tangible, non-transitory media for storing programming and/or data, and unless restricted to such "storage" media, terms such as computer or machine "readable medium" refer to any medium that participates in providing instructions to a processor for execution.

Such a machine readable medium may take many forms, including but not limited to, a tangible storage medium, a carrier wave medium or physical transmission medium. Non-volatile storage media include, for example, optical or magnetic disks, such as any of the storage devices in the mobile stations illustrated in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of +holes, a RAM, a ROM, a PROM and EPROM, a Flash-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
AAA: authentication-authorization-accounting
ADS: application download server
AGPS: assisted global positioning system
API: application programming interface
BSC: base station controller
BREW: binary runtime environment for wireless
BS: base station
BTS: base transceiver system
CDMA: code division multiple access
CD-ROM: compact disc read-only memory
CLNR: certified like-new replacement
DACS: digital access cross connect
DNDA: do not disturb application
DSX: digital signal cross connect
DTC/SPM: digital trunk controller/spectrum peripheral model
DVD: digital video disc
DVD-ROM: digital versatile (video) disc read-only memory
EPC: evolved packet core
EPROM: erasable programmable read-only memory
EV-DO: evolution-data optimized
ESN: electronic serial number
GPM: group provisioning manager
GPMD: group provisioning manager device
GPS: Global Positioning System
GSM: global system for mobile communications
GW: gateway
HA: home agent
HLR: home location register
IMS: IP multimedia subsystem
I-NNI: interconnect network-to-network interface
IP: Internet protocol
IR: infrared
LBS: location based services
LBSI: location based services infrastructure
LCD: liquid crystal display
LDAP: lightweight directory access protocol
LTE: long-term evolution
MC: message center
MDN: mobile directory number
MIN: mobile identification number
MME: mobility management entity
MPC: mobile positioning center
MS: mobile station
MSC: mobile switching center
MT: mobile traffic
NAS: non-access stratum
PC: personal computer
PDE: position determining entity
PN: pseudo-random noise
PROM: programmable read-only memory
PSDN: packet data serving node
PSTN: public switched telephone network
RAM: random access memory
RAN: radio access network
RF: radio frequency
RNC: radio network controller
R-NNI: roaming network-to-network interface
SCM: service creation manager
SCMD: service creation manager device
SIF: standard interchange format
SIP: session initiation protocol
SMPP: short message peer-to-peer
SMS: short messaging service
SNMP: simple network management protocol
SS7: signaling system 7
STP: signaling transfer points
TCP: transmission control protocol
TDMA: time-division multiple access UE: user equipment
UMTS: universal mobile telecommunications system
UNI: user-to-network interface
USB: universal serial bus
VANC: VOLGA access network controller
VLR: visitor location register
VOIP: voice over interne protocol
VOLGA: voice over LTE via generic access
VOLTE: voice over LTE
WAN: wide are network
XCVR: transceiver
ZPD: zone provisioning device

What is claimed is:

1. A method comprising steps of:
   (a) receiving an incoming call for a destination mobile station connected to a wireless mobile communications network;
   (b) directing the call to a voicemail platform;
   (c) duplicating incoming audio of the call as sent to the voicemail platform for recording;
   (d) directing the duplicated audio to the destination mobile station in real-time; and
   (e) audibly outputting the duplicated audio from the destination mobile station in real-time as the message is being recorded at the voicemail platform.

2. The method of claim 1, wherein step (a) of receiving the incoming call comprises receiving the incoming call over a packet switched network.

3. The method of claim 2, wherein the incoming call is received over a form of packet switched transport selected from the group consisting of: voice over internet protocol (VOIP), voice over long-term evolution (LTE) via generic access (VOLGA), and a voice over LTE (VOLTE).

4. The method of claim 2, wherein step (c) of duplicating comprises utilizing a media gateway.

5. The method of claim 4, wherein utilizing a media gateway comprises directing one set of voice packets to a mobile switching center (MSC) for direction as the duplicate audio to the mobile station and directing another set of voice packets to a storage in the voicemail platform.

6. The method of claim 1, wherein step (a) of receiving the incoming call comprises receiving a call over a circuit switched network.

7. The method of claim 6, wherein step (a) of receiving the incoming call comprises utilizing SS7 signal switching.

8. The method of claim 6, wherein step (c) of duplicating comprises utilizing a media gateway.

9. The method of claim 6, wherein utilizing the media gateway comprises directing one set of voice packets to a mobile switching center (MSC) for direction as the duplicate audio to the mobile station and directing another set of voice packets to a storage in the voicemail platform.

10. The method of claim 1, wherein step (a) of receiving the incoming call comprises receiving the incoming call from a mobile station.

11. The method of claim 1, wherein step (a) of receiving the incoming call comprises receiving the incoming call from a landline phone.

12. The method of claim 1, wherein step (a) of receiving the incoming call comprises receiving the incoming call from automated equipment.

13. The method of claim 1, wherein the voicemail platform is a network element in the wireless mobile communications network and is configured for communication with the destination mobile station.

14. A network infrastructure comprising:
   a wireless network configured to receive a call and direct the call to a called mobile station;
   a voicemail platform for storing a voicemail message resulting from the call in response to the mobile station not accepting the call; and
   a media gateway configured to cause duplication of the voicemail message in real time as the message is being recorded and to route the duplicated message through the wireless network to the mobile station for live real-time audible output from the called mobile station as the message is being recorded at the voicemail platform.

15. The network infrastructure of claim 14, wherein the media gateway is configured to route the duplicated message through the wireless network to the mobile station as a one-way transmission without the ability to induce any audio communication from the mobile station to the call origination.

16. The network infrastructure of claim 14, wherein the infrastructure comprises a packet-switched infrastructure.

17. The network infrastructure of claim 16, wherein the packet-switched infrastructure comprises a type of infrastructure selected from the group consisting of: a voice over internet protocol (VOIP) infrastructure, a voice over long-term evolution (LTE) via generic access (VOLGA) infrastructure, and a voice over LTE (VOLTE) infrastructure.

18. The network infrastructure of claim 16, wherein the packet-switched infrastructure is a voice over long-term evolution (LTE) via generic access (VOLGA) infrastructure, and the VOLGA infrastructure comprises a VOLGA access network controller (VANC).

19. The network infrastructure of claim 14, wherein the wireless network is a long-term evolution (LTE) network.

20. The network infrastructure of claim 19, wherein LTE network comprises an Evolved Packet Core.

21. The network infrastructure of claim 14, wherein the voicemail platform for storing the voicemail message is in the wireless network and is configured for communication with the called mobile station.

* * * * *